Oct. 3, 1933.  W. FERRIS  1,929,185
FEED MECHANISM FOR MACHINE TOOLS
Filed March 14, 1930  2 Sheets-Sheet 1
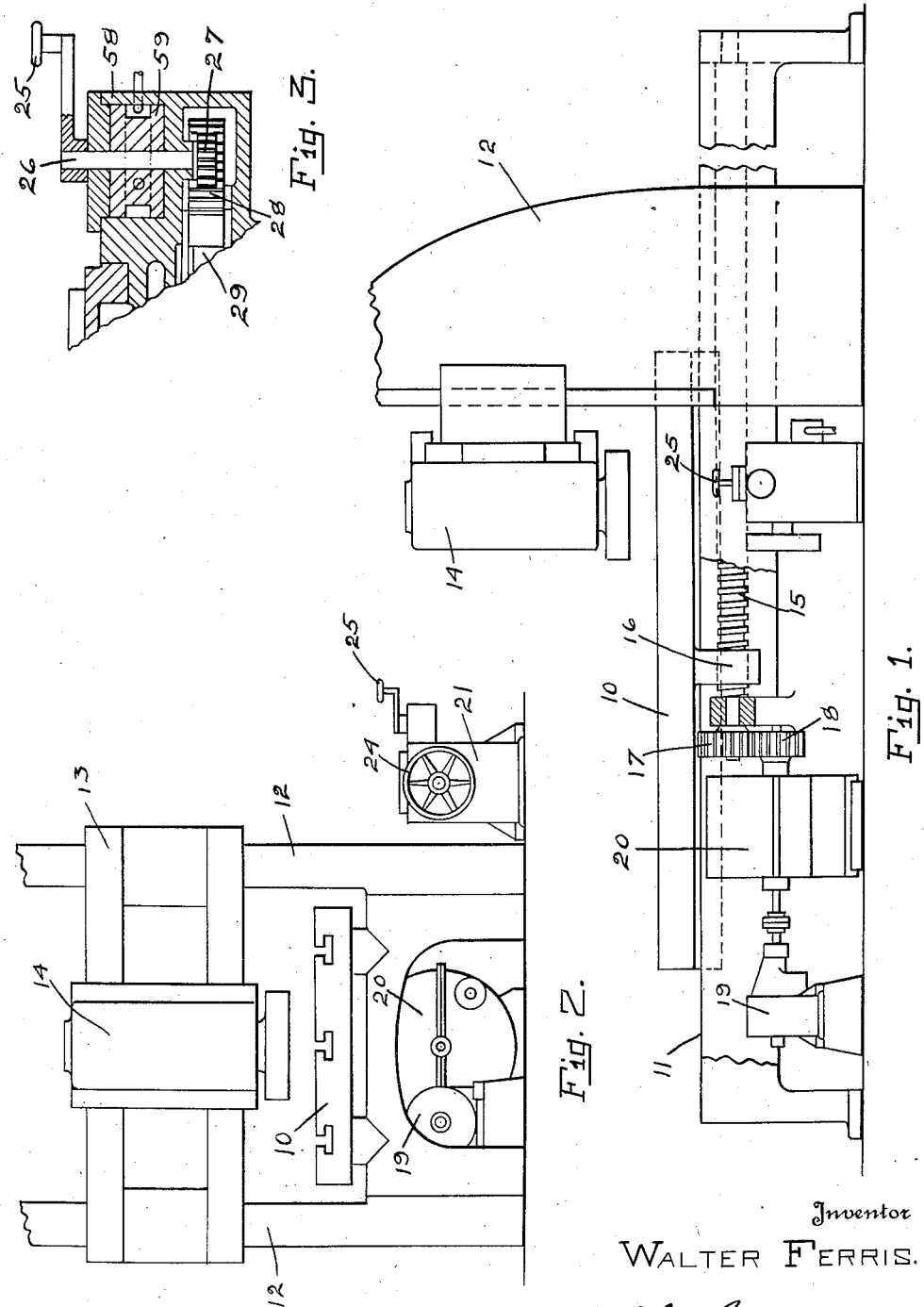
Inventor
WALTER FERRIS.
By Ralph Brown
Attorney

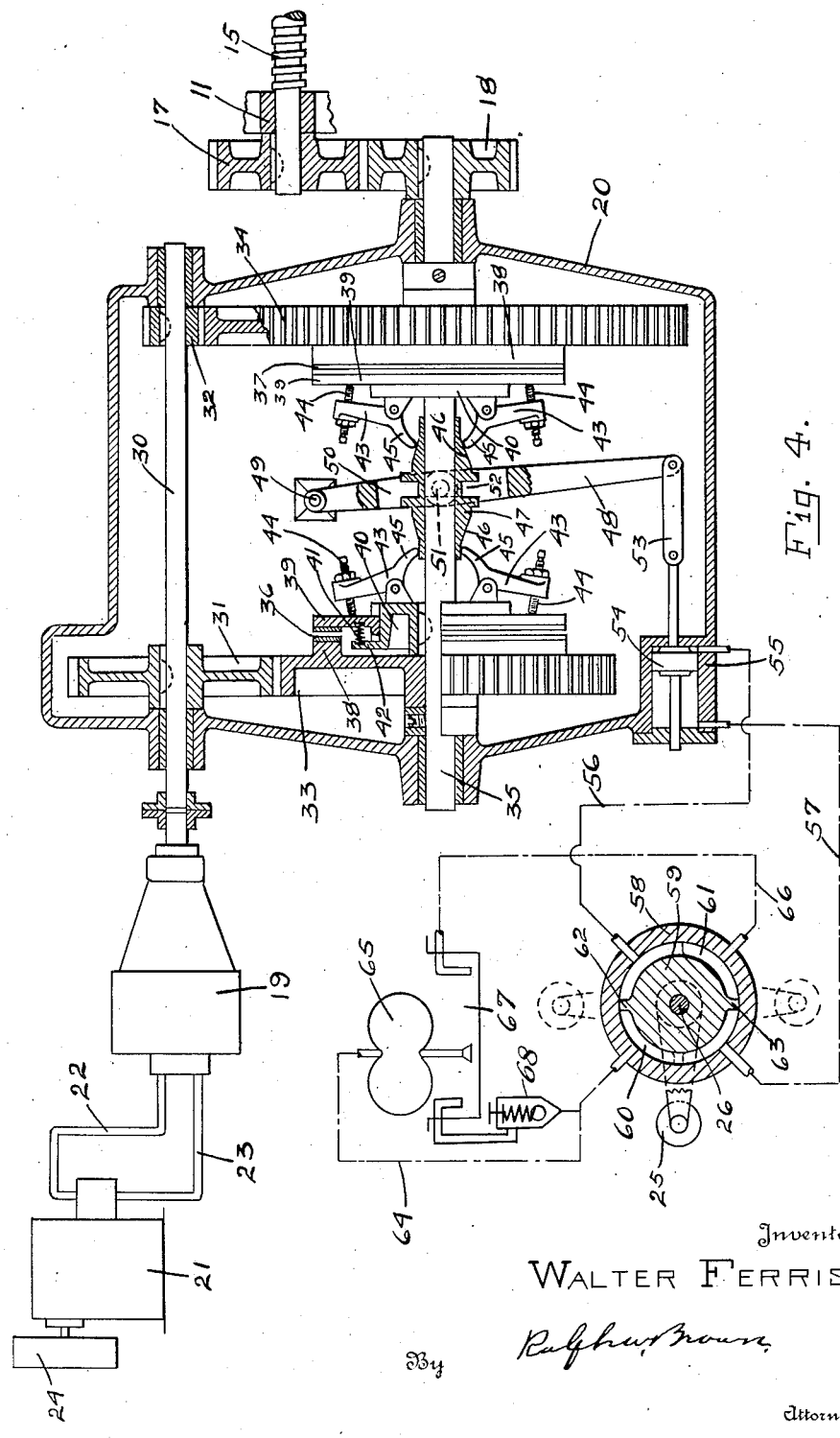

Patented Oct. 3, 1933

1,929,185

UNITED STATES PATENT OFFICE 1,929,185

FEED MECHANISM FOR MACHINE TOOLS

Walter Ferris, Milwaukee, Wis., assignor to The Oilgear Company, Milwaukee, Wis., a corporation of Wisconsin Application March 14, 1930. Serial No. 435,679

12 Claims. (Cl. 60—53)

This invention relates to hydraulically actuated feed mechanisms for machine tools.

Hydraulic feed mechanisms now in general use ordinarily include a cylinder and coacting piston energized by either a constant or variable displacement pump for operating the driven part, such as a tool or work holder. The pump is usually of the constant speed, variable displacement type placed under the control of mechanism, either manually or automatically operated, for regulating pump displacement so as to effect an accurate regulation of the rate of movement of the driven part. Idle rapid traverse movements of the driven part are ordinarily effected by the use of an auxiliary pump whose discharge is utilized to promptly increase the rate of liquid supplied to the feed cylinder, and thus promptly increase the rate of movement of the driven part. Such feed mechanisms have proven entirely satisfactory for many types of machines, but are inapplicable to those machines in which the required travel of the driven part is in excess of practicable cylinder lengths.

One object of the present invention is the provision of an improved hydraulic feed mechanism free from the above mentioned limitation and which will provide an accurately regulated feed motion at slow or moderate speeds during the cut and promptly available rapid motion for idle traverse movements. This I have accomplished by the use of a feed screw or equivalent mechanism driven by a pump fed rotary motor whose speed may be accurately regulated to provide the required feed motion within a limited speed range, together with a change speed mechanism adjustable to promptly increase the speed above said range for rapid traverse purposes.

Other more specific objects and advantages will appear from the following description of an illustrative embodiment of the present invention.

In the accompanying drawings:—

Figure 1 is a side elevation, partly in section, of a planer type milling machine equipped with a feed mechaism embodying the present invention.

Fig. 2 is an end elevation thereof.

Fig. 3 is a fragmentary sectional view of the pump control mechanism.

Fig. 4 is a diagrammatic illustration of the feed and control system including a horizontal sectional view of the change speed mechanism employed.

For purposes of illustration and explanation an embodiment of the present invention is shown applied to a conventional form of planer type milling machine having the usual work supporting table 10 mounted for lengthwise travel in appropriate ways upon an elongated horizontal bed 11. A standard 12 rising above the bed provides a rigid support for a conventional crossrail 13, vertically adjustable thereon and providing horizontal ways for an appropriate tool head 14. The table 10 is driven by a feed screw 15 journalled at opposite ends in the bed 11 and threaded in a stationary nut 16 carried by and beneath the table.

In this instance the screw 15 is driven by a pinion 17, fixed to one end thereof, and meshing with a pinion 18, driven by a hydraulic motor 19 through a variable speed gear transmission 20 preferably of a type to be later described. The motor 19 is driven at various selective speeds by liquid supplied directly from a variable displacement pump 21 through a closed hydraulic circuit comprising pipes 22 and 23.

The motor shown is a constant displacement multiple piston, rotary motor of the type fully described in the prior patent to Magie and Ferris No. 1,502,310; and the pump shown is a variable displacement, multiple piston, rotary pump of the type fully described in my prior Patent No. 1,558,002. The pump is driven at constant speed through appropriate means, such as a pulley 24, and the displacement thereof is placed under the control of a lever 25, which may be operated either manually or automatically by appropriate mechanism under table control. As indicated in Fig. 3, the lever 25 is fixed to the upper end of a rotary spindle 26 having a pinion 27 fixed to the lower end thereof and meshing with a rack 28 formed on a control stem 29. The arrangement is such that with the handle 25 in the intermediate full-line position of Fig. 4, pump displacement is zero, there is no flow in pipes 22 and 23 and the motor 19 is at rest; but when the handle is swung in either direction from intermediate position the pump produces a flow in pipes 22 and 23 at a rate and in a direction dependent upon the extent and direction of movement of the handle from that position, causing the motor 19 to operate in one direction or the other and at a corresponding rate.

The variable speed gear transmission 20, shown particularly in Fig. 4, comprises a shaft 30 directly coupled to the motor 19 and carrying a large pinion 31 and small pinion 32 fixed thereto. Pinions 31 and 32 mesh with small and large gears 33 and 34, respectively, loose on a shaft 35 and selectively connectable thereto through appropriate clutches 36 and 37. Shaft 35 carries and drives the pinion 18. In this instance each gear 33 and 34 carries a clutch ring 38 for cooperation with a movable clutch ring 39 splined on a hub 40 keyed or otherwise fixed to the shaft 35. Each clutch is yieldably urged toward open condition by a series of compression springs, one of which is shown at 41, interposed between the movable clutch ring 39 and a flange 42 formed on the hub 40. Each hub also carries a plurality of radially disposed clamp levers 43, rockable thereon, each lever carrying a screw 44 which bears against the movable clutch ring and each having a tail portion 45 which rides on one tapered end 46 of a double-ended control sleeve 47 slidable upon the shaft 35 intermediate the clutches. The sleeve 47 is operated and controlled by a lever 48 rockably supported at one end 49 and fashioned to provide a yoke 50 surrounding the sleeve 47 and carrying a pair of trunnions 51 engaged within a groove 52 formed intermediate the ends of the sleeve.

The arrangement is such that with the lever 48 in the position shown in Fig. 4 the sleeve 47 has been shifted toward the right and the movable clutch ring 39 of clutch 37 is held, by the action of levers 43, against the clutch ring 38 on gear 34, so that clutch 37 is closed, and gear 34 is connected in driving relation with shaft 35. In this position of the lever 48 the clamp levers 43 of the clutch 36 are released so that clutch 36 is open and gear 33 is free. The shaft 35, and consequently screw 15, are then driven from shaft 30 at relatively slow speed through the small pinion 32. To increase the speed ratio, lever 48 is swung toward the left to thereby close clutch 36 and open clutch 37 and thus free gear 34 from and connect gear 33 to the shaft 35, whereupon shaft 35, and consequently the screw 15, are driven at relatively high speed through the large pinion 31. The rate of travel of the table 10 may thus be promptly increased by shifting the lever 48 toward the left from the position shown in Fig. 4.

In the machine shown the variable speed gear transmission 20 is placed under the control of mechanism which responds automatically to the position of the pump control lever 25. In this instance the lever 48 is connected through appropriate linkage 53 to a piston 54 fitted in a cylinder 55 in the transmission housing. Two pipes 56 and 57, communicating with the opposite ends of the cylinder 55, lead to the circular housing 58 of a control valve of appropriate form attached to the pump. The control valve, shown in Figs. 3 and 4, is in the form of a disk 59, closely fitted in the housing 58, and fixed to and rotatable with the spindle 26. The valve disk 58 contains two peripheral channels 60 and 61 separated by diametrically disposed partitions 62 and 63. Pipes 56 and 57 enter the housing 58 at diametrically opposite points so that each normally communicates with one or the other of the channels 60 and 61. A pipe 64, supplied with liquid from an auxiliary pump 65, enters the valve housing 58 at a point spaced from the pipe 56, and an exhaust pipe 66 communicates with the housing at a point diametrically opposite the point of connection of pipe 64. The auxiliary pump 5 is preferably in the form of a gear pump, ordinarily contained in the main pump housing and receiving its supply from a sump 67 in the base of pump housing. The pipe 66 discharges into the sump.

The arrangement is such that with the pump control lever 25 in the intermediate full-line position of Fig. 4 pipe 57 communicates with the supply pipe 64 through channel 60, so that the left end of the cylinder 55 is exposed to pressure and the piston 54 and lever 48 are forced to the right, whereby the clutch 37 is closed and the clutch 36 is open, the right end of the cylinder 55 being open to exhaust through the pipe 56, channel 61, and pipe 66. When the piston 54 stalls against the right end of the cylinder 55, the auxiliary pump discharges through a relief valve 68 into the sump 67. This condition maintains throughout limited movement of the pump control lever 25 in either direction from the intermediate position shown, so that the screw 15 is rotated in one direction or the other at a slow but variable rate dependent upon the extent and direction of movement of the lever 25 within that limited range. But when the lever 25 is swung beyond that range so as to cause one of the partitions 62 or 63 of the valve 59 to pass one of the pipes 64 or 57, the supply pipe 64 is connected with pipe 56 leading to the right end of the cylinder 55, and the piston 54 and lever 48 are forced to the left to thereby open cluch 37 and close clutch 36 and thus effect rapid rotation of the screw 15, the left end of the cylinder 55 being open to exhaust through pipes 57 and 66.

In the pump shown the pump control lever 25 may be swung through a total range of one hundred eighty degrees, ninety degrees in either direction from the intermediate full-line position of Fig. 4 into either of the dotted line positions shown. When the lever 25 is in intermediate position pump displacement is zero and the motor 19 is at rest, and movement of the lever in either direction from the intermediate position effects a gradual increase in pump displacement and motor speed, maximum displacement and maximum motor speed being obtained when the lever reaches either of the ninety degree positions shown. In this instance pipes 64 and 56 enter the valve housing 58 at points, ninety degrees apart, and pipes 66 and 57 enter the housing at points ninety degrees apart, and when the lever 25 is in intermediate position partition 62 is midway between pipe connections 64 and 56, and partition 63 is midway between pipe connections 66 and 57. With this specific arrangement it will be noted that, throughout a forty five degree movement of the pump control lever in either direction from the intermediate position, the pipe 64 is connected through channel 60 with pipe 57, the clutch 37 remains closed, and the screw 15 and table 10 are driven at a relatively slow rate appropriate for feeding, this feed rate being adjustable to best suit the requirements of the work by movement of the control lever throughout that limited range. The lower half of the total range of adjustment of the pump is thus available for feeding at any rate desired for that purpose.

But when the pump control lever 25 is swung beyond this forty five degree position in either direction pipe 64 is connected with pipe 56, to thereby effect closure of the clutch 36 and thus effect an abrupt increase in the rate of rotation of the screw 15 and consequently an abrupt increase in the rate of movement of the table 10. This increased rate of table movement is appropriate for idle rapid traverse movements thereof and may be varied by adjustment of the lever 25 within the second forty five degree range of movement thereof. The upper half of the total range of adjustment of the pump is thus available for rapid traversing at various rates most appropriate for prevailing conditions.

Various changes may be made in the embodiment of the invention hereinabove specifically described without departing from or sacrificing the advantages of the invention as defined in the appended claims.

I claim:—

1. In a machine tool or the like the combination of a support, a member guided for translatory movement thereon, mechanism for moving said member, a hydraulic motor for driving said mechanism, a variable displacement pump for driving said motor, control means, means responsive to said control means for regulating pump displacement to thereby effect movement of said member at regulated speeds within a limited speed range, and a variable speed transmission between said motor and mechanism responsive to said control means for effecting movement of said member at a speed above said range.

2. In a machine tool or the like the combination of a support, a member guided for translatory movement thereon, feed mechanism for moving said member, a variable speed hydraulic transmission including a pump and motor for driving said mechanism, control means, means responsive to said control means for regulating the speed of said motor to thereby effect feed movement of said member at various speeds within a limited speed range, and a variable speed transmission between said motor and mechanism responsive to said control means for effecting rapid traverse movement of said member at a speed above said range.

3. In a machine tool or the like the combination of a support, a member guided for translatory movement thereon, mechanism for moving said member, a variable speed hydraulic transmission including a pump and motor for driving said mechanism, control means, means responsive to said control means for varying the speed of said motor to thereby effect movement of said member at various speeds within a limited speed range, a variable speed gear transmission between said motor and mechanism adjustable to increase the rate of movement of said member above said range, and means responsive to said control means for automatically controlling said variable speed gear transmission.

4. In a machine tool or the like the combination of a support, a member guided for translatory movement thereon, a feed screw for moving said member, a variable speed hydraulic transmission including a pump and motor for driving said screw, control means, means responsive to said control means for varying the speed of said motor to thereby regulate the rate of movement of said member within one speed range, and a variable speed gear transmission between said motor and screw responsive to said control means to effect movement of said member within a second speed range.

5. In a machine tool or the like the combination of a support, a member guided for translatory movement thereon, mechanism for moving said member, a variable speed hydraulic transmission including a pump and motor, a variable speed gear transmission driven by said motor for driving said mechanism, control means for said hydraulic transmission operable to vary the speed of said motor, and means automatically operable at a predetermined speed of said motor for adjusting said gear transmission, to thereby effect movement of said member at variable rates within each of a plurality of speed ranges.

6. In a machine tool or the like the combination of a support, a member guided for translatory movement thereon, mechanism for moving said member, a variable speed hydraulic transmission including a pump and motor for driving said mechanism, control means for said transmission operable to vary the speed of said motor, and means automatically operable at a predetermined speed of said mechanism to vary the speed of said mechanism relative to that of said motor.

7. In a machine tool or the like the combination of a support, a member guided for translatory movement thereon, mechanism for moving said member, a variable speed hydraulic transmission including a pump and motor for driving said mechanism, control means for said transmission operable to vary the speed of said motor, and means automatically operable at an intermediate speed of said motor to increase the speed of said mechanism relative to said motor, to thereby effect movement of said member at variable rates within a low speed range for feeding and within a high speed range for rapid traversing.

8. In a machine tool or the like the combination of a support, a member guided for translatory movement thereon, mechanism for moving said member, a variable speed hydraulic transmission including a pump and motor, a variable speed gear transmission driven by said motor for driving said mechanism, control means for said hydraulic transmission operable to vary the speed of said motor, and hydraulically actuated means controlled by said control means and operable on said gear transmission to vary the speed of said mechanism relative to said motor.

9. In a machine tool or the like the combination of a support, a member guided for translatory movement thereon, mechanism for moving said member, a variable speed hydraulic transmission including a pump and motor, a variable speed gear transmission driven by said motor for driving said mechanism, hydraulically actuated means operable on said gear transmission to vary the speed of said mechanism relative to said motor, and means for regulating said hydraulic transmission and for controlling said hydraulically actuated means.

10. In a machine tool or the like the combination of a support, a member guided for translatory movement thereon, mechanism for moving said member, a variable speed hydraulic transmission including a variable displacement pump and a motor driven by said pump, a variable speed gear transmission driven by said motor for driving said mechanism, hydraulically actuated means operable on said gear transmission to vary the speed of said mechanism relative to said motor, a valve for controlling said hydraulically actuated means, and means for varying the displacement of said pump and for operating said valve.

11. In a machine tool or the like the combination of a driven member, a variable speed hydraulic transmission including a pump and motor, a variable speed gear transmission driven by said motor for driving said member, said gear transmission including clutch mechanism for controlling the same, and means for regulating said hydraulic transmission to vary the speed of said motor and for operating said clutch mechanism to vary the speed of said member relative to said motor.

12. In a machine tool or the like the combination of a driven member, a variable speed hydraulic transmission including a pump and motor, a variable speed gear transmission driven by said motor for driving said member, said gear transmission including clutch mechanism for controlling the same, fluid actuated means for operating said clutch mechanism, and means for regulating said hydraulic transmission and for controlling said fluid actuated means.

WALTER FERRIS.